(12) United States Patent
Lamping et al.

(10) Patent No.: US 6,324,551 B1
(45) Date of Patent: Nov. 27, 2001

(54) SELF-CONTAINED DOCUMENT MANAGEMENT BASED ON DOCUMENT PROPERTIES

(75) Inventors: John O. Lamping, Los Altos; James P. Dourish; Warren K. Edwards, both of San Francisco; Anthony G. LaMarca, Redwood City; Karin Petersen, Palo Alto; Michael P. Salisbury, Mountain View; Douglas B. Terry, San Carlos; James D. Thornton, Redwood City, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/144,383

(22) Filed: Aug. 31, 1998

(51) Int. Cl.$^7$ .................................................. G06F 17/21

(52) U.S. Cl. ........................................ 707/500; 707/104.1

(58) Field of Search .................................. 707/500, 524, 707/511, 517, 522, 523, 1, 10, 200, 104.1, 100; 709/328; 713/161, 200–202; 717/1, 11; 345/335, 804

(56) References Cited

U.S. PATENT DOCUMENTS

| | | | |
|---|---|---|---|
| 5,473,691 | * 12/1995 | Menezes et al. | 713/161 |
| 5,517,655 | * 5/1996 | Collins et al. | 395/800 |
| 5,860,073 | * 1/1999 | Ferrel et al. | 707/522 |
| 5,872,974 | * 2/1999 | Mezick | 717/1 |
| 5,892,909 | * 4/1999 | Grasso et al. | 395/200.31 |
| 6,023,714 | * 2/2000 | Hill et al. | 707/513 |
| 6,101,510 | * 8/2000 | Stone et al. | 707/513 |
| 6,108,661 | * 8/2000 | Caron et al. | 707/102 |
| 6,122,649 | * 9/2000 | Kanerva et al. | 707/516 |

FOREIGN PATENT DOCUMENTS

| | | |
|---|---|---|
| 2 192 237 A | 5/1997 | (CA) . |
| WO 911 14222 A | 9/1991 | (WO) . |

OTHER PUBLICATIONS

Dewan, et al, A High–Level and Flexible Framework for Implementing Multiuser User Interfaces, ACM Transactions on Information Systems, vol. 10, No. 4. pp. 345–380, Oct. 1992.*

Bier, Eric A., "EmbeddedButtons: Supporting Buttons in Documents", ACM Transactioons on Information Systems, vol. 10, No. 4, pp. 381–407, Oct. 1992.*

Dewan et at, "Flexible user interface coupling in a colaboratibe system", Conference on Human Factors and Computing Systems, pp. 41–48, May 1991.*

(List continued on next page.)

*Primary Examiner*—Joseph H. Feild
(74) *Attorney, Agent, or Firm*—Fay, Sharpe, Fagan, Minnich & McKee, LLP

(57) ABSTRACT

A document management system is provided which organizes, stores and retrieves documents in accordance with document properties. A property attachment mechanism allows a user to define and attach static properties and/or active properties to a document. The active properties include executable code which control the behavior of the document contents. Upon transferring a document to another user, system, or environment, the document management system combines the document content and properties as a self-contained document which can interpret and manipulate its own contents. In this manner, a receiving user does not require additional applications in order to manipulate the document contents into a usable format. The self-contained document interprets and manipulates itself using its active properties to provide a useful document to the receiving user.

12 Claims, 4 Drawing Sheets

OTHER PUBLICATIONS

Calvary, et al, "From single-user architectural design to PAC*: a generic software architecture model for CSCW", Conference on Human Factors and computing Systems, pp. 242–249, Mar. 1997.*

Bier, Eric A., "EmbeddedButtons: documents as user interfaces", Symposium on User Interface Software and Technology, pp. 45–53, Nov. 1991.*

Benford, et al, "Informing the design of collaborative virtual environments", Conference on Supporting Group Work, pp. 71–80, Nov. 1997.*

Sleeter, Melissa E., "OpenDoc–Building Online Help for a Component–Oriented Architecture", 1996, SigDoc '96, ACM 0–89–791–799–5/0087, pp. 87–94.*

Slic: An Extensibility System for Commodity Operating Systems, Ghormley et al., (Computer Science Division, Univ. of CA at Berkley) Feb. 11, 1998.

Finding and Reminding: File Organization From the Desktop, Barreau et al., (Sigchi, vol. 27, No. 3, Jul. 1995).

Finding and Reminding, Reconsidered, Fertig et al., (Sigchi, vol. 28, No. 1, Jan. 1996).

Information Visualization Using 3D Interactive Animation, Robertson et al., (Communications of the ACM, vol. 36, No. 4, Apr. 1993).

Using a Landscape Metaphor to Represent a Corpus of Documents, Matthew Chalmers, (Rank Xerox EuroPARC, in Proc. European Conf. on Spatial Information Theory, Elba, Sep. 1993).

Semantic File Systems, Gifford et al., (Programming Systems Research Group, 1991 ACM 0–89791–447–3/91/0009/0016) 1991.

A Pile Metaphor for Supporting Casual Organization of Information, Mander et al., (Chi '92, 1992 ACM 0–89791–513–5/92/0005–0627).

Representing Information About Files, Jeffrey Mogul, (Computer Science Dept., Stanford, University, CH2021–4/84/0000/0432$01.00 1984 IEEE).

Zeller E: "Seamless integration of online 1–12 services in the Oberon document system" Modular Programming Languages, Joint Modular Languages Conference, JMLC '97. Proceedings, Proceedings of 1997 Joint Modular Languages Conference, Linz, Austria, Mar. 19–21, 1997, pp. 366–379, XP000940821 1997, Berlin, Germany, Springer–Verlag, Germany.

Interposition Agents: Transparently Interposing User Code at the System Interface, Michael B. Jones, (Microsoft Research, Microsoft Corp.) Proceedings of the 14th ACM Symposium on Operating System Principles, pp. 80–90; 1993.

Lifestreams: Organizing Your Electronic Life, Freeman et al., (Yale University, Dept of Computer Science) Proceedings of the CHI 96 Conference Companion on Human Factors in Computing Systems, pp. 410–411; 1996.

The Digital Library Integrated Task Enironment (DLITE), Cousins et al., (Stanford University / Xerox PARC) Jul. 1997.

Semantic File Systems, Gifford et al., (Programming Systems Research Group, 1991 ACM 0–89791–447–3/91/0009/0016).

* cited by examiner

SELF-CONTAINED DOCUMENT MANAGEMENT BASED ON DOCUMENT PROPERTIES

BACKGROUND OF THE INVENTION

The following applications are related to the present invention: U.S. Ser. No. 09/143,802 now U.S. Pat. No. 6,266,670, Anthony G. LaMarca, et al., entitled USER LEVEL ACCESSING OF LOW-LEVEL COMPUTER SYSTEM OPERATIONS; U.S. Ser. No. 09/143,551, Karin Petersen, et al., entitled PROPERTY-BASED USER LEVEL DOCUMENT MANAGEMENT; U.S. Ser. No. 09/143,778 now U.S. Pat. No. 6,269,380, Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS; U.S. Ser. No. 09/144,143, Warren K. Edwards, et al., entitled ATOMIC AND MOLECULAR DOCUMENTS; U.S. Ser. No. 09/144,555, Michael P. Salisbury, et al, entitled VIRTUAL DOCUMENTS; U.S. Ser. No. 09/143,773 now U.S. Pat. No. 6,240,420, James D. Thornton, et al., entitled SERVICE INTERACTION USING PROPERTIES ATTACHED TO DOCUMENTS; U.S. Ser. No. 09/144,230 now U.S. Pat. No. 6,253,217, James P. Dourish, et al., entitled ACTIVE PROPERTIES FOR DYNAMIC SYSTEM CONFIGURATION; U.S. Ser. No. 09/143,777, Warren K. Edwards, et al., entitled EXTENDING APPLICATION BEHAVIOR THROUGH DOCUMENT PROPERTIES; U.S. Ser. No. 09/143,772, Michael P. Salisbury, et al., entitled MAINTAINING DOCUMENT IDENTITY ACROSS FILE SYSTEM INTERFACES; U.S. Ser. No. 09/144,032 now U.S. Pat. No. 6,266,682, Anthony G. LaMarca, et al, entitled CLUSTEhRINO RELATED FILES IN A DOCUMENT MANAGEMENT SYSTEM.

Each of the above applications filed Aug. 31, 1998 and assigned to a common assignee are hereby incorporated by reference.

The present invention is directed to document management systems. It finds particular application to a system and method which creates a self-contained document when the document is transferred and will be described with particular reference thereto.

The inventors have recognized that a large amount of a user's interaction with a computer has to do with document management, such as storing, filing, organizing and retrieving information from numerous electronic documents. These documents may be found on a local disc, on a network system file server, an e-mail file server, the world wide web, or a variety of other locations. Modem communication delivery systems have had the effect of greatly increasing the flow of documents which may be incorporated within a user's document space, thereby increasing the need for better tools to visualize and interact with the accumulated documents.

The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, the character string D:\TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation. Thus, while a user's conception of a structure by which files should be organized may change over time, the hierarchy described above is fixed and rigid. While moving individual files within such a structure is a fairly straightforward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user—who is not the author—may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled.

The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ). To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDav also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the present invention. Also, in DocuShare properties can be visible to anyone who has read access for the collection in which the document is in. Properties are tightly bound to documents and it is generally difficult to maintain a personalized set of properties for a document, again a different approach than the one described in the present invention.

An operating system "SPIN" from the University of Washington allows users to inject code into the kernel that is invoked when an appropriate system call or system state occurs. (For example, users can inject code that alters paging decisions.) If it has already been done, their technology could be used to make it possible to inject code into the file system to invoke a user's code on read and write. Among the differences between SPIN and the concepts of present invention are that code injected into SPIN runs at the kernel level and users can only express their behaviors in a restricted, safe language in which it is not possible to do "bad things." As such, expressiveness is limited. On the other hand, the properties in the present invention run at the user level, and can have GUIs call out to third party libraries and in general be far more expressive than a kernel injected spindle. Further, the properties of the present invention are expressed in terms of documents, as in "I attach property X to Document Y." The SPIN system, on the other hand, extends a system call such as "read". The example behaviors mentioned above are more easily mapped into a system such as the present invention in which properties are explicitly attached to individual documents.

Other work which allows operating system calls to be extended into user's code include, the article "Interposition Agents: Transparently Interposing User Code and System Interface," by Michael B. Jones in Proceedings of the $14^{th}$ Symposium on Operating Systems, Principles, Asheville, N.C., December, 1993, pages 80–93. The article "SLIC: An Extensibility System for Commodity Operating Systems," by Douglas P. Ghormley, Steven H. Rodriguez, David Petrou, Thomas E. Anderson, which is to appear in the USENIX 1998 Annual Technical Conference, New Orleans, La., June 1998.

Further, the Windows NT (from Microsoft) has a function called "Filter Drivers" which, once installed, can see the accesses made to a file system. Installing filter drivers is a privileged operation, not available to normal users. As such, a user level mechanism, such as the document properties of the present invention and event dispatching architecture would be needed to allow users to express their desired behaviors.

There are also systems which, in a very specific domain, allow users to apply behaviors when documents are accessed. An example is the Tandem e-mail system, which has a "screen cobal" language and has hooks to find out when events occur. This system allows users to code filters to do custom operations when documents arrive and/or are read. One of the differences between this system and the present invention, is that the Tandem system solves the problem in a specific domain and invokes only the user's behaviors when the documents are accessed via the mail application. In the present invention, the behaviors are invoked regardless of the application and regardless of the interface.

The paper, "Finding and Reminding: File Organization From the Desktop", D. Barreau and B. Nardi, SIGCHI Bulletin, 27 (3) July, 1995, reviews filing and retrieval practices and discusses the shortcomings of traditional file and retrieval mechanisms. The paper illustrates that most users do not employ elaborate or deep filing systems, but rather show a preference for simple structures and "location-based searches", exploiting groupings of files (either in folders, or on the computer desktop) to express patterns or relationships between documents and to aid in retrieval.

In response to the Barreau article, the article, "Find and Reminding Reconsidered", by S. Fertig, E. Freeman and D. Gelernter, SIGCHI Bulletin, 28(1) January, 1996, defends deep structure and search queries, observing that location-based retrieval is, "nothing more than a user-controlled logical search." There is, however, one clear feature of location-based searching which adds to a simple logical search-in a location-based system, the documents have been subject to some sort of pre-categorization. Additional structure is then introduced into the space, and this structure is exploited in search and retrieval.

The article "Information Visualization Using 3D Interactive Animation", by G. Robertson, S. Card and J. Mackinlay, Communications of the ACM 36 (4) April, 1993, discusses a location-based structure, an interesting feature is that it is exploited perceptually, rather than cognitively. This moves the burden of retrieval effort from the cognitive to the perceptual system. While this approach may be effective, the information that the systems rely on is content-based, and extracting this information to find the structure can be computationally expensive.

The article "Using a Landscape Metaphor to Represent a Corpus of Documents," Proc. European Conference on Spatial Information Theory, Elba, September, 1993, by M. Chalmers, describes a landscape metaphor in which relative document positions are derived from content similarity metrics. A system, discussed in "Lifestreams: Organizing your Electronic Life", AAAI Fall Symposium: AI Applications in Knowledge Navigation on Retrieval (Cambridge, Mass.), E. Freeman and S. Fertig, November, 1995, uses a timeline as the major organizational resource for managing document spaces. Lifestreams is inspired by the problems of a standard single-inheritance file hierarchy, and seeks to use contextual information to guide document retrieval. However, Lifestreams replaces one superordinate aspect of the document (its location in the hierarchy) with another (its location in the timeline).

The article "Semantic File Systems" by Gifford et al., Proc. Thirteenth ACM Symposium of Operating Systems Principals (Pacific Grove, Calif.) October, 1991, introduces the notion of "virtual directories" that are implemented as dynamic queries on databases of document characteristics. The goal of this work was to integrate an associating search/retrieval mechanism into a conventional (UNIX) file system. In addition, their query engine supports arbitrary "transducers" to generate data tables for different sorts of files. Semantic File System research is largely concerned with direct integration into a file system so that it could extend the richness of command line programming interfaces, and so it introduces no interface features at all other than the file name/query language syntax. In contrast, the present invention is concerned with a more general paradigm based on a distributed, multi-principal property-based system and with how interfaces can be revised and augmented to deal with it; the fact that the present invention can act as a file system is simply in order to support existing file system-based applications, rather than as an end in itself.

DLITE is the Stanford Digital Libraries Integrated Task Environment, which is a user interface for accessing digital library resources as described in "The Digital Library Integrated Task Environment" Technical Report SIDL-WP-1996-0049, Stanford Digital Libraries Project (Palo Alto, Calif.) 1996, by S. Cousins et al. DLITE explicitly reifies queries and search engines in order to provide users with direct access to dynamic collections. The goal of DLITE, however, is to provide a unified interface to a variety of search engines, rather than to create new models of searching and retrieval. So although queries in DLITE are independent of particular search engines, they are not integrated with collections as a uniform organizational mechanism.

Multivalent documents define documents as comprising multiple "layers" of distinct but intimately-related content. Small dynamically-loaded program objects, or "behaviors", activate the content and work in concert with each other and layers of content to support arbitrarily specialized document types. To quote from one of their papers, "A document management infrastructure built around a multivalent perspective can provide an extensible, networked system that supports incremental addition of content, incremental addition of interaction with the user and with other components, reuse of content across behaviors, reuse of behaviors across types of documents, and efficient use of network bandwidth."

Multivalent document behaviors (analogs to properties) extend and parse the content layers, each of which is expressed in some format. Behaviors are tasked with understanding the formats and adding functionality to the document based on this understanding. In many ways, the Multivalent document system is an attempt at creating an infrastructure that can deal with the document format problem by incrementally adding layers of "understanding" of various formats. In contrast, the present invention has an explicit goal of exploring and developing a set of properties that are independent of document format. While properties could be developed that could parse and understand content, it is expected that most will be concerned with underlying storage, replication, security, and ownership attributes of the documents. Included among the differences between the present invention and the Multivalent concepts are that, the Multivalent document system focuses on extensibility as a tool for content presentation and new content-based behaviors; the present invention focuses on extensible and incrementally-added properties as a user-visible notion to control document storage and management.

File systems known as the Andrew File System (AFS), Coda, and Ficus provide a uniform name space for accessing files that may be distributed and replicated across a number of servers. Some distributed file systems support clients that run on a variety of platforms. Some support disconnected file access through caching or replication. For example, Coda provides disconnected access through caching, while Ficus uses replication. Although the immediately described distributed file systems support document (or file) sharing, they have a problem in that a file's hierarchical pathname and its storage location and system behavior are deeply related. The place in the directory hierarchy where a document gets stored generally determines on which servers that file resides.

Distributed databases such as Oracle, SQL Server, Bayou, and Lotus Notes also support shared, uniform access to data and often provide replication. Like some distributed file systems, many of today's commercial databases provide support for disconnected operation and automatic conflict resolution. They also provide much better query facilities than file systems. However, distributed databases suffer the same problems as file systems in that the properties of the data, such as where it is replicated and how it is indexed and so on, are generally associated with the tables in which that data resides. Thus, these properties cannot be flexibly managed and updated. Also, the set of possible properties is not extensible.

A digital library system, known as the Documentum DocPage repository, creates a document space called a "DocBase." This repository stores a document as an object that encapsulates the document's content along with its attributes, including relationships, associated versions, renditions, formats, workflow characteristics, and security. These document objects can be infinitely combined and re-combined on demand to form dynamic configurations of document objects that can come from any source.

DocPage supports organization of documents via folder and cabinet metaphors, and allows searching over both document content and attributes. The system also provides checkin/checkout-style version control, full version histories of documents, and annotations (each with its own attributes and security rules). The system also supports workflow-style features including notification of updates. DocBase uses a replicated infrastructure for document storage (see: http://www.documentum.com).

Among the differences between Documentum DocPage and the present invention are: First, in the present system properties are exposed as a fundamental concept in the infrastructure. Further, the present system provides for a radically extensible document property infrastructure capable of supporting an aftermarket in document attributes. Documentum seems to be rather closed in comparison; the possible attributes a document can acquire are defined a priori by the system and cannot be easily extended. Additionally, Documentum does not have the vision of universal access to the degree of the present invention which supports near-universal access to document meta-data, if not document content. In comparison, the scope of Documentum narrows to document access within a closed setting (a corporate intranet).

In traditional file systems, a document's location or name determines its access privileges, compression, version tracking, backup, access time, etc. In other words, the document's location determines its document management characteristics. Thus, whenever a document's location changes, whenever it is moved or copied or emailed, or otherwise transferred from one directory or machine to another, its document management characteristics will typically change. Therefore, a user is burdened with monitoring and modifying the management characteristics of each document whenever its location changes.

The present invention contemplates a new and improved method and system for managing documents when transferring documents and which overcomes the above-referenced problems and others.

SUMMARY OF THE INVENTION

In accordance with one aspect of the present invention, a document management system and method is provided for transferring a document stored at a first location by a first user to a second location. The document is formed to include content and a document reference which are distinguishable from each other. Document properties can be attached either to base documents or to a principal's document reference. Properties attached to a document may include either static properties describing information about the document or active properties controlling behaviors of the document. An active property which is associated to the document includes executable code for interpreting and manipulating the content of the document. When the document is transferred to a second location, the transferring automatically includes the association between the content and the properties of the document such that, upon directly opening the document without use of an application, the active property associated to the document executes the executable code which interprets and manipulates the content of the document into a useful format.

In accordance with another aspect of the present invention, a method of managing a document during a transfer of the document to a receiving user is provided. Properties are attached to the document which included static properties describing characteristics of the document and active properties controlling behaviors of the document. Selected properties of the static properties and active properties are transferred to the receiving user. The document is then reconstructed by the receiving user based on the transferred static and active properties.

One advantage of the present invention is that documents are structured to include content and properties which are associated to each other. A document management system is thus provided which organizes documents in accordance with their properties which are defined by a user.

Another advantage of the present invention is that active properties are attached to a document which interpret and control the behavior of a document's content.

Another advantage of the present invention is that arbitrary active properties alone or in combination with static properties can encapsulate multiple independent behaviors that can be triggered by distinct independent events.

Another advantage of the present invention is that upon transferring a document, the document contents and active properties are combined into a self-contained document which can interpret and manipulate its own content format. In this manner, a receiving user can access the self-contained document contents without knowing its format and without requiring appropriate applications.

Another advantage of the present invention is that the document management behavior, not only the access to its content, can be encapsulated with the document and transferred to the receiving user in the same manner.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PREFERRED EMBODIMENT

Figure 1:
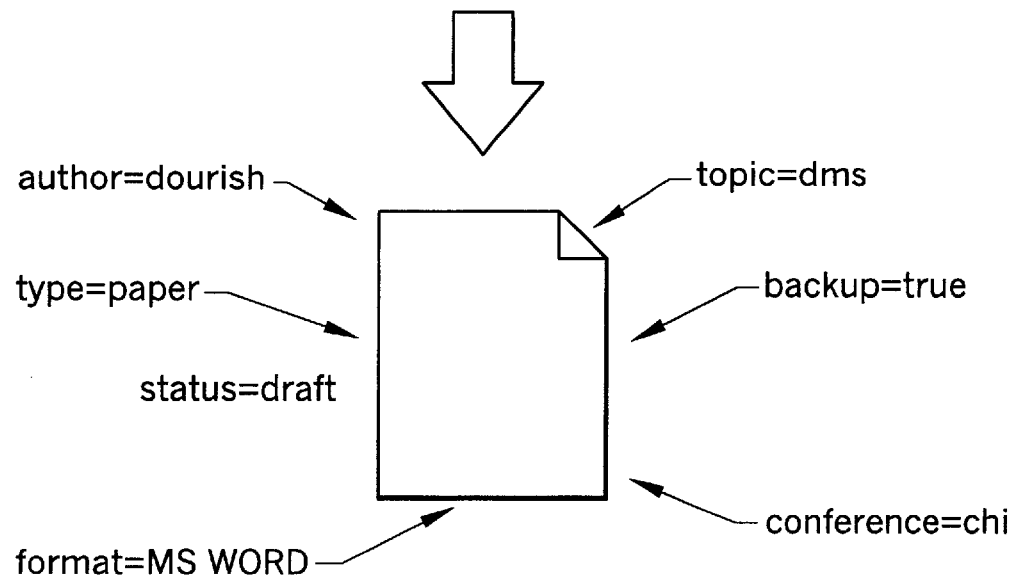
FIG. 1 shows a hierarchical storage mechanism compared to the concept of properties of the present invention.

Prior to discussing the present invention in greater detail, it is believed a glossary of terms used in the description would be beneficial. Therefore, the following definitions are set forth:

Action: The behavior part of a property.

Active Property: A property in which code allows the use of computational power to either alter the document or effect another change within the document management system.

Arbitrary: Ability to provide any property onto a document.

Base Document: Corresponds to the essential bits of a document. There is only one Base Document per document. It is responsible for determining a document's content and may contain properties of the document, and it is part of every principal's view of the document.

Base Properties: Inherent document properties that are associated with a Base Document.

Bit Provider: A special property of the base document. It provides the content for the document by offering read and write operations. It can also offer additional operations such as fetching various versions of the document, or the encrypted version of the content.

Browser: A user interface which allows a user to locate and organize documents.

Collection: A type of document that contains other documents as its content.

Combined Document: A document which includes members of a collection and content.

Content: This is the core information contained within a document, such as the words in a letter, or the body of an e-mail message.

Content Document: A document which has content.

Distributed: Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored.

DMS: Document Management System

Document: This refers to a particular content and to any properties attached to the content. The content referred to may be a direct referral or an indirect referral. The smallest element of the DMS. There are four types of documents; Collection, Content Document, No-Content Document and Combined Document.

Document Handle: Corresponds to a particular view on a document, either the universal view, or that of one principal.

DocumentID: A unique identifier for each Base Document. A Reference Document inherits the DocumentID from its referent. Document identity is thus established via the connections between Reference Document References and Base Documents. Logically, a single document is a Base Document and any Reference Documents that refer to it.

Kernel: Manages all operations on a document. A principal may have more than one kernel.

Multi-Principal: Ability for multiple principals to have their own set of properties on a Base Document wherein the properties of each principal may be different.

Notification: Allows properties and external devices to find out about operations and events that occur elsewhere in DMS.

No Content Document: A document which contains only properties.

Off-the-Shelf Applications: Existing applications that use protocols and document storage mechanisms provided by currently existing operating systems.

Principal: A "User" of the document management system. Each person or thing that uses the document management system is a principal. A group of people can also be a principal. Principals are central because each property on a document can be associated with a principal. This allows different principals to have different perspectives on the same document.

Property: Some bit of information or behavior that can be attached to content. Adding properties to content does not change the content's identity. Properties are tags that can be placed on documents, each property has a name and a value (and optionally a set of methods that can be invoked).

Property Generator: Special case application to extract properties from the content of a document.

Reference Document: Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (both in the reference and on the Base Document). Even an owner of a Base Document can also have a Reference Document to that base, in which he places personal properties of the document that should not be considered an essential part of the document and placed in all other principal's view.

Space: The set of documents (base or references) owned by a principal.

Static Property: A name-value pair associated with the document. Unlike active properties, static properties have no behavior. Provides searchable meta-data information about a document.

Introduction

As discussed in the background of the invention, the structure that file systems provide for managing files becomes the structure by which users organize and interact with documents. However, documents and files are not the same thing. The present invention has as an immediate goal to separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

FIG. 1 illustrates a distinction between hierarchical storage systems whose documents are organized in accordance with their location described by a hierarchical structure and the present invention where documents are organized according to their properties (e.g. author=dourish, type=paper, status=draft, etc.). This means documents will retain properties even when moved from one location to another, and that property assignment can have a fine granularity.

Figure 2:
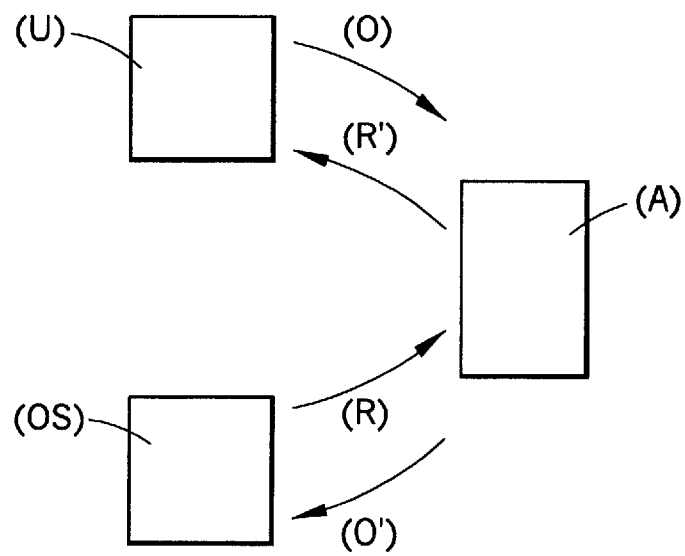
FIG. 2 is a block diagram of a document management system according to the present invention, interposed within a communication channel between a user and an operating system.

To integrate properties within the document management system of the present invention, the properties need to be presented within the content and/or property read/write path of a computer system, with the ability to both change the results of an operation as well as take other actions. The outline of the concept is described in FIG. 2, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Document Management System (DMS) Architecture

Figure 3:
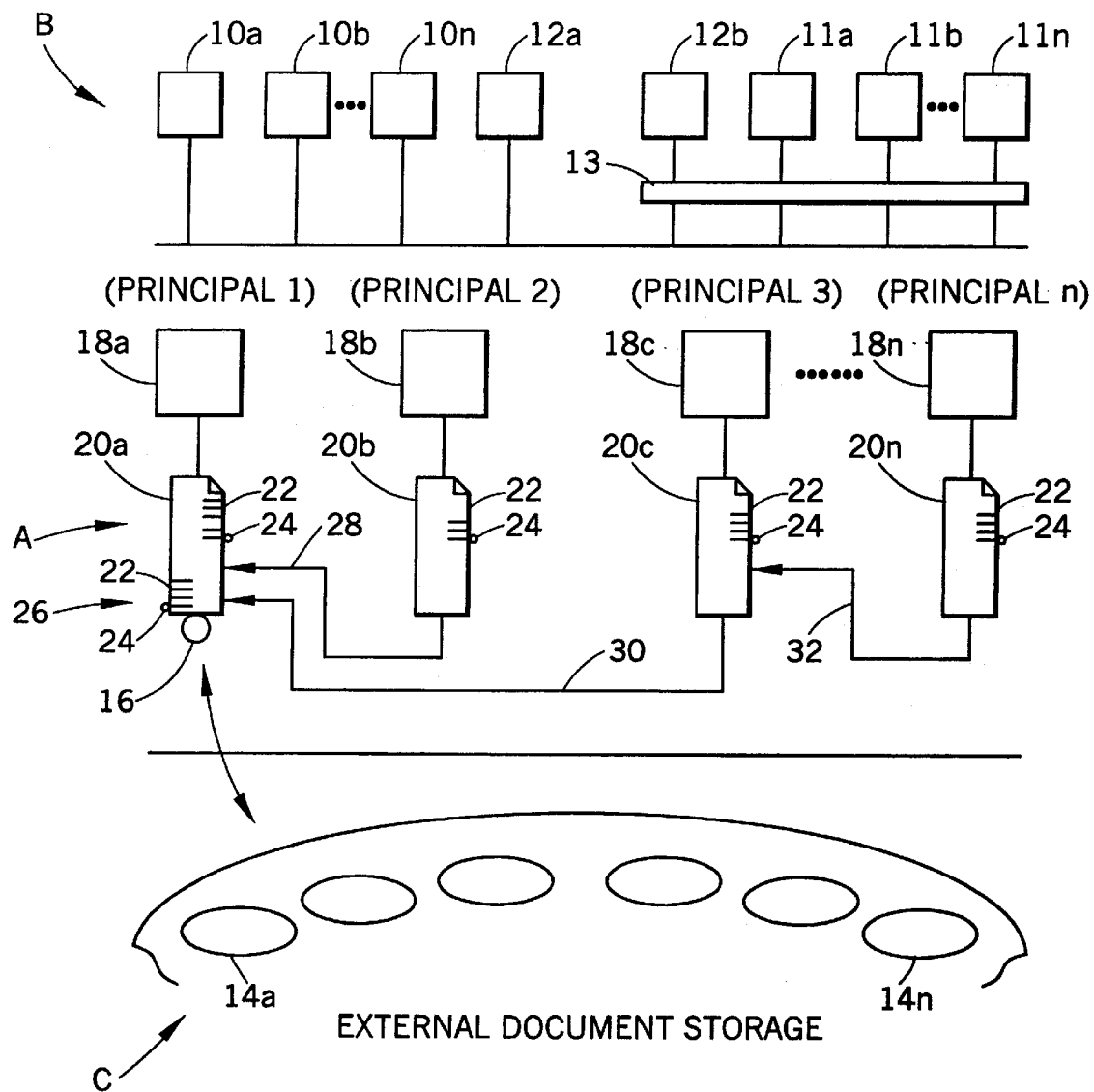
FIG. 3 is a representation of a document management system of the present invention implemented in a computer system.

FIG. 3 sets forth the architecture of a document management system (DMS) A of the present invention in greater detail. Document management system (DMS) A is shown configured for operation with front-end components B, and back-end components C. Front-end components B include applications 10a–10n and 11a–11n, such as word processing applications, mail applications among others. Some of the applications are considered DMS aware 10a–10n which means these applications understand DMS protocols for storing, retrieving and otherwise interacting with DMS A. Other components are considered non-DMS aware 11a–11n. Browsers 12a (DMS aware) and 12b (non-DMS aware) are considered specialized forms of applications. In order for the non-DMS-aware applications 11a–11n and 12b to be able to communicate with DMS A, front-end translator 13 is provided.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers, such as bit provider 16, are used. These bit providers are provided with the capability to translate appropriate storage protocols.

Principals 1-n each have their own kernel 18a–18n for managing documents, such as documents 20a–20n. Documents 20a–20n are considered to be documents the corresponding principal 1-n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–20c. As will be discussed in greater detail below, in addition to base document 20a having static properties 22 and/or active properties 24, base document 20a will also carry base properties 26 which can be static properties 22 and/or active properties 24. Static properties are shown with a "–" and active properties are shown with a "–o".

Reference documents 20b–20c are configured to interact with base document 20a. Both base documents and reference documents can also hold static properties 22 and/or active properties 24. When principals 2,3 access base document 20a for the first time, corresponding reference documents 20b–20c are created under kernels 18b–18c, respectively. Reference documents 20b–20c store links 28 and 30 to unambiguously identify their base document 20a. In particular, in the present invention each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20c of Principal 3. By this link principal n will be able to view (i.e. its document handle) the public properties principal 3 has attached to its reference document 20c as well as the base properties and public reference properties of base document 20a. This illustrates the concept of chaining.

The above described architecture allows for sharing and transmission of documents between principals and provides the flexibility needed for organizing documents. With continuing attention to FIG. 3, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well. Using the described architecture, DMS A of the present invention does not require the principal to operate within a strict hierarchy such as in file or folder-type environments. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties.

Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

Support for Native Applications

A DMS document interface provides access to documents as Java objects. Applications can make use of this interface by importing the relevant package in their Java code, and coding to the API provided for accessing documents, collections and properties. This is the standard means to build new DMS-aware applications and to experiment with new interaction models. DMS Browser 12 (of FIG. 3) can be regarded as a DMS application and is built at this level. The DMS document interface provides Document and Property classes, with specialized subclasses supporting all the functionality described here (such as collections, access to WWW documents, etc.). Applications can provide a direct view of DMS documents, perhaps with a content-specific visualization, or can provide a wholly different interface, using DMS as a property-based document service back-end.

Support for Off-the-Shelf Applications

Another level of access is through translators (such as translator 13 of FIG. 3). In an existing embodiment, a server implementing the NFS protocol is used as the translator. This is a native NFS server implementation in pure Java. The translator (or DMS NFS server) provides access to the DMS document space to any NFS client; the server is used to allow existing off-the-shelf applications such as Microsoft Word to make use of DMS documents; on PC's, DMS simply looks like another disk to these applications, while on UNIX machines, DMS A looks like part of the standard network filesystem.

Critically, though, what is achieved through this translator is that DMS A is directly in the content and property read/write path for existing or off-the-shelf applications. The alternative approach would be to attempt to post-process files written to a traditional filesystem by applications, such as Word, that could not be changed to accommodate DMS A. By instead providing a filesystem interface directly to these applications, it makes it possible to execute relevant properties on the content and property read/write path. Furthermore, it is ensured that relevant properties (such as ones which record when the document was last used or modified) are kept up-to-date. Even though the application is written to use filesystem information, the DMS database remains up to date, because DMS A is the filesystem.

As part of its interface to the DMS database layer, NFS provides access to the query mechanism. Appropriately formatted directory names are interpreted as queries, which appear to "contain" the documents returned by the query. Although DMS provides this NFS service, DMS is not a storage layer. Documents actually live in other repositories. However, using the NFS layer provides uniform access to a variety of other repositories (so that documents available over the Web appear in the same space as documents in a networked file system). The combination of this uniformity along with the ability to update document properties by being in the read and write path makes the NFS service a valuable component for the desired level of integration with familiar applications. It is to be appreciated that while a server implementing NFS protocol is discussed other servers could also be used. Furthermore, it is to be appreciated that the use of Java is only one implementation option, and that other languages can be used.

Property Attachment

Figure 4:
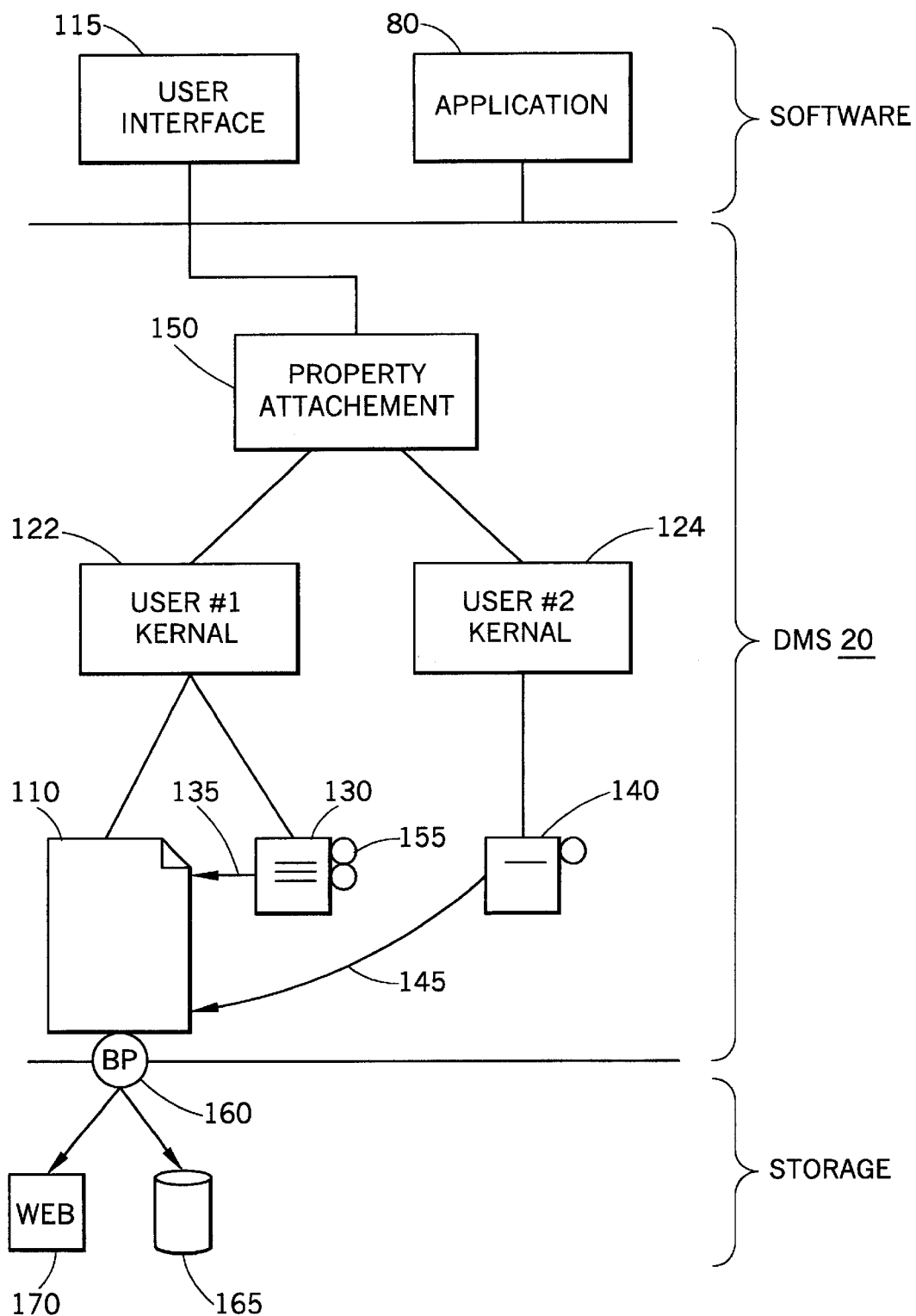
FIG. 4 is a configuration of the present document management system which allows properties to be attached to documents.

FIG. 4 shows an overall system for attaching properties to a document 110 in accordance with the present invention. A user interface 115 allows a user to select a desired document and select one or more properties to be attached to the selected document. The document management system (DMS) A locates and retrieves the selected document in accordance with its management system protocol. As explained previously, in the Preferred Embodiment, documents are stored and retrieved based on their properties rather than hierarchial path and file names. Application 80 communicates to the DMS directly if it is DMS aware or communicates through the translator 13 (FIG. 3) if the application is non-DMS aware.

In FIG. 4, the selected document 110 is found to be owned by user #1. However, the user wishing to attach a property to document 110 can be any user in the system. The document management system A maintains properties on a per user per document basis using individual kernels. Kernel 122 manages documents and properties for user #1 and kernel 124 manages documents and properties for user #2. Thus, a user #1 can generate a document reference 130 comprising a set of properties for a document 110 (associated via link 135) which are independent from the properties 140 of user #2 (associated via link 145). Note that the properties can be represented together with the base document as in FIG. 3 or can be represented separate from the base document as in FIG. 4.

A property attachment mechanism 150 is provided by the document management system A which generates, configures and attaches a document reference 130 to the document 110 using association links 135. In the preferred embodiment, the document 110 is identified by a unique ID and the document reference 130 refers to the document using the same unique ID. The document reference 130 includes static properties (represented by horizontal lines) and active properties (represented by circles). Static properties are simple name-value pairs on documents which are relevant to a user, for example, "author=Joe" or "topic= interesting." An active property 155 has a name-value and includes executable program code and/or instructions for automatically performing an operation or service without a user's involvement. Documents can be collected, searched and retrieved based on static properties and/or active properties.

The active property 155 is configured to be activated by a triggering event which is defined by the user. Attaching the active property 155 to the document 110 forms an association between the property and the document. The association is external to the data that represents the content of the document 110. Thus, the association is independent of content type, the application format used to generate the document, and other characteristics of the document 110. The content of document 110 is controlled by a bit provider 160 which identifies the location of the data (e.g. local disk 165, world wide web 170, a camera, or any data supplying source), indicates how the data from the sources are combined to form the content of the document 110, includes a translation interface to communicate to the data source if required, and other selected parameters which define the content. Thus, a document is formed to include the base 110, a document reference 130 and one or more content data associated thereto. The document content may include associations to one or more other base documents which define a collection of documents.

Document Transfer

The present invention is particularly related to transferring a document from one user to another, from one machine to another or from one infrastructure to another. To transfer a document, for example, with a move, copy or download operation, the document management system A packages the document base 110, the document properties 130 and any internal state defined and maintained by the static and active properties into a self-contained unit. The self-contained unit identifies the document content and provides for the implementation of the document's management behavior through its active properties. If necessary, the actual content is also transferred such as a transfer to a laptop. When the self-contained document is received at a destination, the document automatically unpacks itself in accordance with the behaviors coded in its associated active properties. The document is reconstructed with functioning properties such that the document is useful to a user in the new infrastructure environment.

An exemplary application of the present invention involves compressing a document prior to transferring it to another location. In a conventional system, when a document is compressed and transferred to a receiving user, the document is unusable due to its compressed form. The receiving user must identify the correct decompression program and apply it to the compressed document before the document can be used. If the receiving user does not have the appropriate decompression program, the problem is magnified. The present invention eliminates these types of problems with the document management system A which generates and transfers a self-contained document which includes intelligence to manipulate itself, thus, the document formats itself to be useful to the receiving user.

Figure 5:
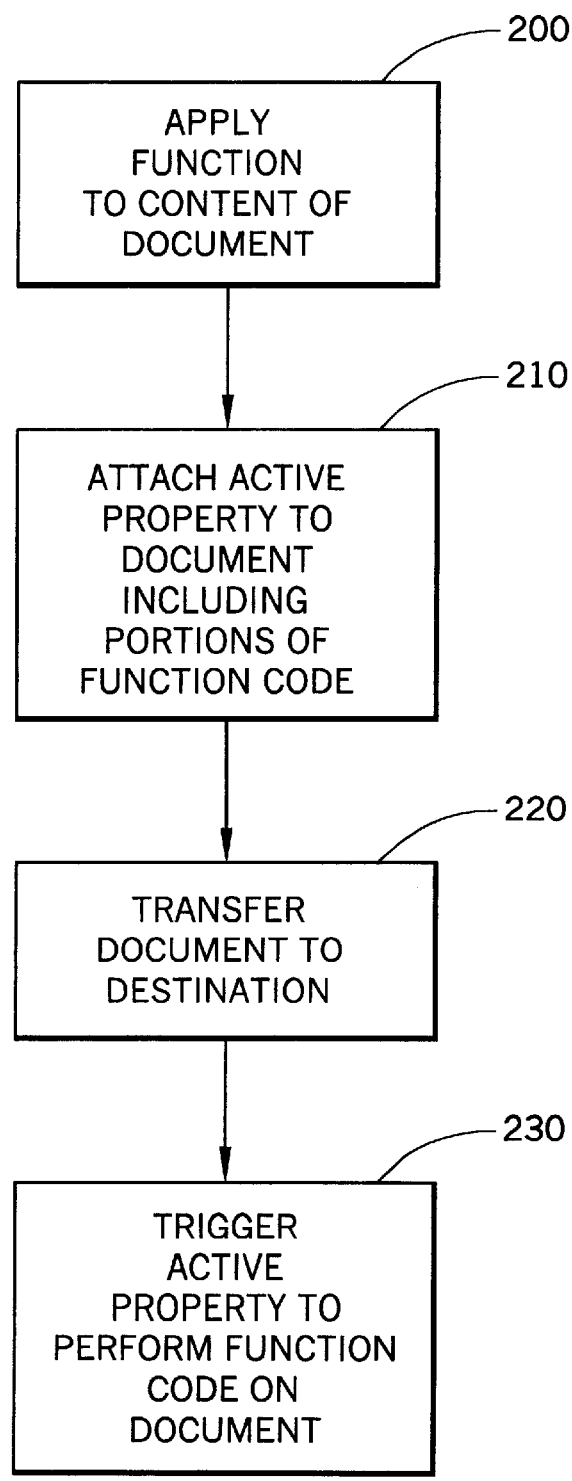
FIG. 5 is flow diagram showing the generation of a self-contained document having function code contained within an active property in accordance with the present invention.

With reference to FIG. 5, prior to transferring, a function is applied 200 to the content of the document. In the present example, the function is a compression routine. An active property is generated and attached 210 to the document. The active property includes executable code for controlling the behavior of the content in response to the applied function. Here, the active property includes decompression code to uncompress the content automatically upon the user opening the document. The self-contained document is then transferred 220 to a destination. After arriving at the destination, the appropriate active property is triggered 230 to execute its decompression code which uncompresses the content of the document and converts it to a readable format which is a usable form. In general, the active property executes a function to manipulate the document in response to the original function applied to the document before it was transferred.

As discussed above, an active property is activated by a triggering event which is defined by a user. The triggering event can, of course, be defined as any arbitrary event. In the compression example, the triggering event may be when the receiving user tries to open the document which sets off the uncompression active property or, the completion of the transfer function can trigger the uncompression active property to automatically uncompress the content without a user's interaction. Regardless of the defined triggering event, the self-contained document manages itself through its active properties without a user having to interact with an external application and apply the external application to the document.

The behavior of a document depends on its content, the applications applied to the content, and the applications a user has on their machine. The present document management system A bundles this information when a document is transferred such that the document carries all the context it needs to operate and function. The application behavior and the document behavior are bundled into a self-contained entity, thus, removing the duality of a document and an application. In this manner, the present system transfers a packaged document between users, systems and environments safely and robustly without having a receiving user take additional and unnecessary actions in order to handle the document format.

Furthermore, all the static properties bundled into the self-contained entity provide immediate information for the system of the receiving user to query and index the document, and provide the receiving user with the same static information of the source. Additionally, prior to transferring the document, a selected group of static and active properties can be included in the transferred package. By transferring a selected group of properties, the sending user can control and limit the access rights and behaviors of the document available to the receiving user when the document is reconstructed based on the properties. Furthermore, the base document may be transferred with properties but without content, and upon reconstruction at the receiving end, the content is accessed based on the properties which identify the content.

By way of another example, the content of a document is generated by a word processor. In response, an active property is generated and attached to the document which contains executable code from the word processor. If data size is not a concern, the entire word processor could be included in the active property. However, it is more economical to include portions of the word processor which allow a receiving user to simply view and edit the contents of the document. When the document is transferred to a receiving user, the document contents and active properties are combined as a self-contained document. In this manner, upon triggering the active property, the receiving user can view and edit the contents of the document without having the original word processing application and without ever knowing what that application is.

The document management system A manipulates the document by matching triggering events to the active properties of documents. The active property executes the program code associated to it in response to the triggering event. Thus, the receiving user simply needs to interact with the document itself (e.g. triggers an active property) rather than interacting with and separately executing a word processor. The functionality of the document is included in the active property of the document.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, we now claim:

1. In a non-hierarchical document management system having a document stored at a first location by a first user, a method of transferring the document to a second location comprising the steps of:

forming the document to include a content and a document reference being distinguishable from each other, the document reference maintaining properties attachable by a user which include static properties describing characteristics of the content and active properties controlling behaviors of the content;

attaching an active property to the document reference which is associated to the document, the active property including executable code for interpreting and manipulating the content of the document; and, transferring the document to a second location, the transferring automatically including the association between the content and the properties of the document such that, upon a triggering event and without use of an external application, the active property associated to the document executes the executable code which interprets and manipulates the content of the document into a format such that the content is accessible at the second location.

2. The method as set forth in claim 1 further including storing and retrieving the document based on properties associated to the document.

3. The method as set forth in claim 1 further including, before the transferring, modifying the content of the document in accordance with a function, and incorporating executable code from the function in the active property.

4. The method as set forth in claim 1 further including, before the transferring, adding additional static properties to relate context information about the document to the second location.

5. The method as set forth in claim 1 further including, before transferring, removing selected properties from the document reference to constrain access and behaviors available to a receiving user at the second location.

6. The method as set forth in claim 1 wherein the transferring includes transferring the static and active properties such that the document is obtained and the content is reconstructed at the second location based on the static and active properties.

7. A method of managing a document in a document management system which separates management of user properties and management of content during a transfer of the document to a receiving user comprising the steps of:

forming the document to include a content and a document reference, the document reference maintaining properties attachable by a user;

attaching properties to the document reference including at least one of static properties describing characteristics of the content and active properties controlling behaviors of the content;

transferring selected properties of the static properties and active properties to the receiving user; and, reconstructing the document, by the receiving user, based on the transferred static and active properties.

8. The method as set forth in claim 7 wherein the selected properties cause the document to be reconstructed having limited access and behaviors available to the receiving user.

9. The method as set forth in claim 7 wherein the document includes a content which is separate from the properties, and the reconstructing includes locating the content based on the transferred static and active properties.

10. A method of transferring a document to a destination in a system which manages documents comprising content and properties unattached to the content, the method comprising the steps of:

defining a state and a behavior for the document by attaching properties to a document reference, the properties including at least one of non-executable data and executable code, wherein the non-executable data includes a description of characteristics of the content, and the executable code includes a control for behaviors of the content;

transferring the document reference and the content as a packed self-contained unit to the destination; and unpacking, by the attached properties at the destination, the packed self-contained unit such that the content is usable at the destination without use of external applications.

11. The method as set forth in claim 10 wherein the document includes content, the content being separated from the attached properties.

12. The method as set forth in claim 10 further including:

controlling the behavior of the document with the executable code; and assigning a triggering event to the executable code such that, in response to the triggering event, the executable code is executed to control the behavior of the document.

* * * * *